(12) United States Patent
Miki et al.

(10) Patent No.: US 9,321,501 B1
(45) Date of Patent: Apr. 26, 2016

(54) BICYCLE CONTROL DEVICE

(71) Applicant: Shimano Inc., Sakai, Osaka (JP)

(72) Inventors: Yoshimitsu Miki, Osaka (JP); Yasuhisa Watanabe, Osaka (JP); Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/530,031

(22) Filed: Oct. 31, 2014

(51) Int. Cl.
*B62K 23/06* (2006.01)
*B62M 25/04* (2006.01)
*B62L 3/02* (2006.01)

(52) U.S. Cl.
CPC ............... *B62K 23/06* (2013.01); *B62L 3/023* (2013.01); *B62M 25/04* (2013.01)

(58) Field of Classification Search
CPC .... B62M 25/04; B62M 25/045; B62M 25/08; B62K 23/04; Y10T 74/20438; Y10T 74/20287
See application file for complete search history.

(56) References Cited

U.S. PATENT DOCUMENTS

| 584,635 | A | * | 6/1897 | Hart ............................... 74/489 |
| 5,400,675 | A | | 3/1995 | Nagano |
| 6,691,591 | B2 | * | 2/2004 | Tsumiyama et al. ......... 74/502.2 |
| 8,201,670 | B2 | | 6/2012 | Tetsuka et al. |
| 8,464,844 | B2 | | 6/2013 | Jordan |
| 2007/0068314 | A1 | | 3/2007 | Miki |
| 2008/0196537 | A1 | | 8/2008 | Dal Pra' |
| 2010/0083788 | A1 | | 4/2010 | Jordan et al. |
| 2010/0199798 | A1 | | 8/2010 | Uno |
| 2012/0240715 | A1 | | 9/2012 | Tsai |
| 2012/0297919 | A1 | | 11/2012 | Fukao et al. |
| 2013/0180815 | A1 | | 7/2013 | Dunlap et al. |
| 2013/0255239 | A1 | | 10/2013 | Miki |

* cited by examiner

*Primary Examiner* — Thomas Diaz
(74) *Attorney, Agent, or Firm* — Global IP Counselors

(57) ABSTRACT

A bicycle control device is basically provided with a bracket and an operating unit. The bracket is configured to be coupled to a handlebar. The operating unit is configured to be pivotally mounted to the bracket around a first axis. The operating unit includes a shift unit, a first operating member and a pivot axle structure. The shift unit is configured to operate a wire. The first operating member is configured to operate the shift unit. The pivot axle structure is configured to pivotally mount the operating unit to the bracket around the first axis. The pivot axle structure defines a wire receiving passageway for the wire.

19 Claims, 15 Drawing Sheets

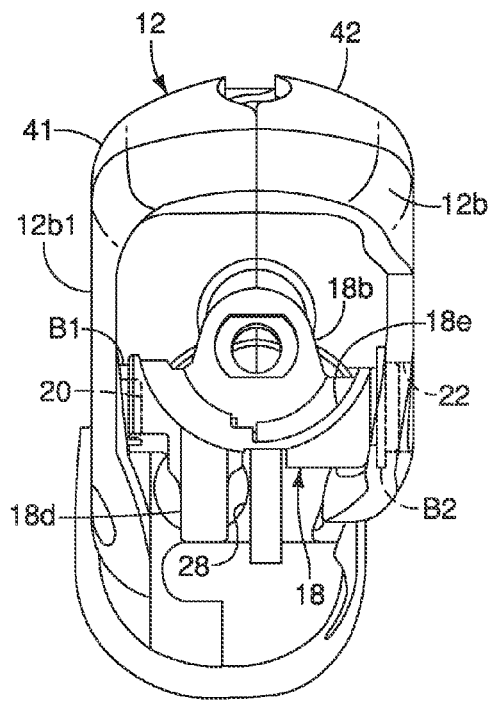
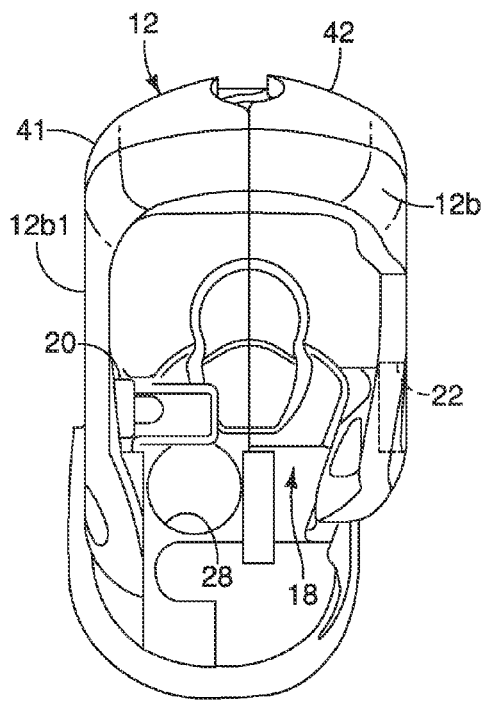
FIG. 4   FIG. 5
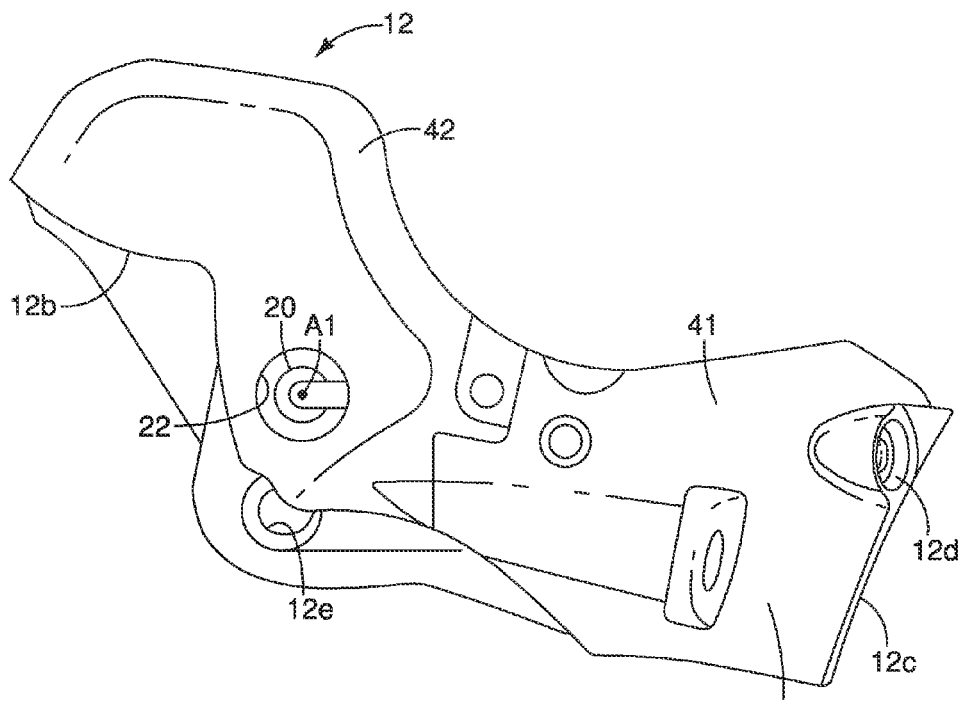
FIG. 6

BICYCLE CONTROL DEVICE

BACKGROUND

1. Field of the Invention

This invention generally relates to a bicycle control device. More specifically, the present invention relates to a bicycle control device having a wire receiving passageway for guiding a wire from a shift unit.

2. Background Information

Most bicycles use bicycle control devices to operate various bicycle components to perform such functions as shifting gears and braking. These bicycle control devices can mechanically, electrically or hydraulically operate the bicycle components. The bicycle control devices are often provided on a handlebar of the bicycle with a mechanical wire, an electrical wire or a hydraulic hose interconnecting the bicycle control device to the bicycle component. When the bicycle control device is installed on the handlebar, the bicycle control device will have a different configuration depending on the type of handlebar. In recent years, some bicycle control devices include both shifting and braking functions.

SUMMARY

Generally, the present disclosure is directed to various features of a bicycle control device. In one feature, a bicycle control device is provided with a wire receiving passageway for guiding a wire from a shift unit.

In view of the state of the known technology and in accordance with a first aspect of the present disclosure, a bicycle control device is provided that basically comprises a bracket and an operating unit. The bracket is configured to be coupled to a handlebar. The operating unit is configured to be pivotally mounted to the bracket around a first axis. The operating unit includes a shift unit, a first operating member and a pivot axle structure. The shift unit is configured to operate a wire. The first operating member is configured to operate the shift unit. The pivot axle structure is configured to pivotally mount the operating unit to the bracket around the first axis. The pivot axle structure defines a wire receiving passageway for the wire.

In accordance with a second aspect of the present invention, the bicycle control device according to the first aspect is configured so that the wire receiving passageway at least partially extends along the first axis.

In accordance with a third aspect of the present invention, the bicycle control device according to the first aspect is configured so that the shift unit includes a wire operating body having a wire connecting structure. The wire operating body is disposed such that the first axis passes through a portion of the wire operating body.

In accordance with a fourth aspect of the present invention, the bicycle control device according to the third aspect is configured so that the first operating member is pivotally provided on the operating unit around a second axis, and the shift unit is configured to rotate the wire operating body around a third axis in a first direction in response to movement of the first operating member.

In accordance with a fifth aspect of the present invention, the bicycle control device according to the fourth aspect is configured so that the operating unit further includes a second operating member pivotally provided around the second axis, and the shift unit is configured to rotate the wire operating body around the third axis in a second direction being opposite to the first direction in response to movement of the second operating member.

In accordance with a sixth aspect of the present invention, the bicycle control device according to the fourth aspect is configured so that the first axis is located below the second axis as viewed in a direction parallel to the first axis in a state where the bicycle control device is mounted to the handlebar.

In accordance with a seventh aspect of the present invention, the bicycle control device according to the sixth aspect is configured so that the third axis is coaxial with the second axis.

In accordance with an eighth aspect of the present invention, the bicycle control device according to the first aspect is configured so that the pivot axle structure has a wire access opening offset from the first axis and communicating with the wire receiving passageway.

In accordance with a ninth aspect of the present invention, the bicycle control device according to the eighth aspect further comprises a wire guide member disposed on the bracket and extending transverse to the first axis. The wire guide member has an end disposed within the wire access opening of the pivot axle structure.

In accordance with a tenth aspect of the present invention, the bicycle control device according to the first aspect is configured so that the bracket includes a first bracket part and a second bracket part, the second bracket part being a separate member that is attached to the first bracket part.

In accordance with an eleventh aspect of the present invention, the bicycle control device according to the tenth aspect is configured so that the first bracket part pivotally supports a first mounting end of the pivot axle structure, and the second bracket part pivotally supports a second mounting end of the pivot axle structure.

In accordance with a twelfth aspect of the present invention, the bicycle control device according to the eleventh aspect is configured so that the shift unit is at least partially disposed between the first bracket part and the second bracket part.

In accordance with a thirteenth aspect of the present invention, the bicycle control device according to the first aspect is configured so that the bracket includes a hydraulic unit receiving cavity.

In accordance with a fourteenth aspect of the present invention, the bicycle control device according to the thirteenth aspect further comprises a hydraulic unit disposed in the hydraulic unit receiving cavity and operatively coupled to the operating unit.

In accordance with a fifteenth aspect of the present invention, the bicycle control device according to the fourteenth aspect is configured so that the hydraulic unit includes a piston that is moved in a direction away from the first axis as the operating unit moves from a rest position to an operated position.

In accordance with a sixteenth aspect of the present invention, the bicycle control device according to the fifteenth aspect is configured so that the piston moves along a fourth axis, the fourth axis is disposed below the first axis as viewed in a direction parallel to the first axis in a state where the bicycle control device is mounted to the handlebar.

In accordance with a seventeenth aspect of the present invention, the bicycle control device according to the first aspect is configured so that the bracket includes a gripping portion, a handlebar coupling surface disposed at a proximal end of the gripping portion and a shift unit housing portion disposed at a distal end of the gripping portion, the gripping portion including a first wire receiving pathway and the shift unit housing portion including a second wire receiving pathway communicating with the first wire receiving pathway.

In accordance with an eighteenth aspect of the present invention, the bicycle control device according to the seventeenth aspect is configured so that the gripping portion has a pair of side surfaces and an upper surface that extends laterally between the side surfaces, the upper surface including the first wire receiving pathway, and the shift unit housing portion has a laterally facing surface that includes the second wire receiving pathway.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure:

FIG. 4 is a front oblique view of the first and second bracket parts of the bracket pivotally supporting the pivot axle structure as viewed parallel to a center cylinder axis of the hydraulic unit receiving cavity;

FIG. 5 is a front oblique view, similar to FIG. 4, of the first and second bracket parts of the bracket as viewed parallel to a center cylinder axis of the hydraulic unit receiving cavity, but with the pivot axle structure removed;

FIG. 6 is an inside elevational view of the bracket for the right bicycle control device illustrated in FIGS. 1 to 3 with all other parts of the right bicycle control device removed;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
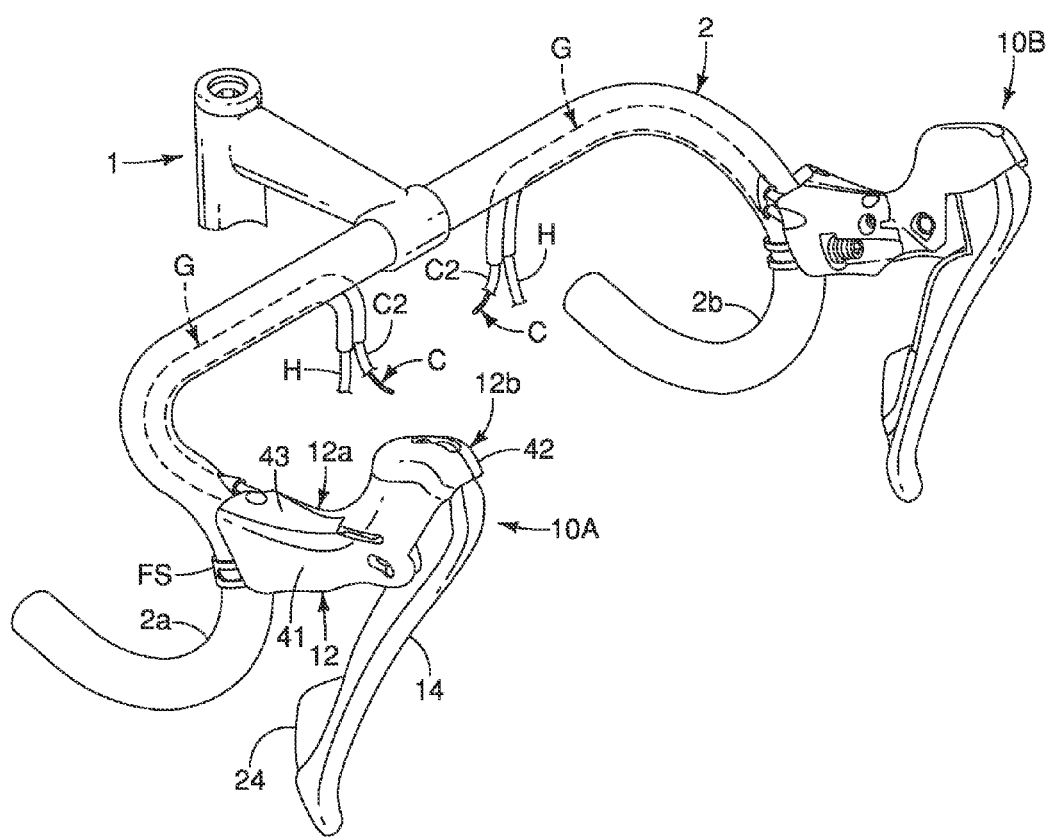
FIG. 1 is a partial front perspective view of a bicycle having a drop handlebar that is equipped with a pair of bicycle control devices in accordance with a first embodiment.

Referring initially to FIG. 1, a portion of a bicycle 1 is illustrated having a handlebar 2 with a pair of bicycle control devices 10A and 10B in accordance with a first embodiment. The bicycle control devices 10A and 10B are configured to be mounted to opposite ends of the handlebar 2, respectively. Here in the first embodiment, the handlebar 2 is a drop handlebar in which the bicycle control devices 10A and 10B are attached to curved sections 2a and 2b, respectively. Thus, each of the bicycle control devices 10A and 10B is a drop handlebar control device, which means that they are configured to be mounted to a curved section of a drop handlebar.

Basically, as seen in FIG. 1, the bicycle control device 10A is a right bicycle control device that is operated by the rider's right hand to actuate a first hydraulic brake device (not shown) and a first transmission (not shown). The bicycle control device 10B is a left bicycle control device that is operated by the rider's left hand to actuate a second hydraulic brake device (not shown) and a second transmission (not shown). The first and second transmission or gear shifting devices are part of a conventional bicycle driving system that is used to shift speed stages or gear stages of the drive train in a relatively conventional manner. The bicycle control device 10A is operatively coupled to the first hydraulic brake device (not shown) via a hydraulic hose H, and to the first transmission (not shown) via a control cable C. The bicycle control device 10B is operatively coupled to the second hydraulic brake device (not shown) via a hydraulic hose H, and to the second transmission (not shown) via a control cable C. The hydraulic hoses H are conventional hydraulic hose that are commonly used in the bicycle field. The control cable C is a conventional Bowden cable including an inner wire C1 and an outer casing C2 which at least partially covers the inner wire C1.

Figure 2:
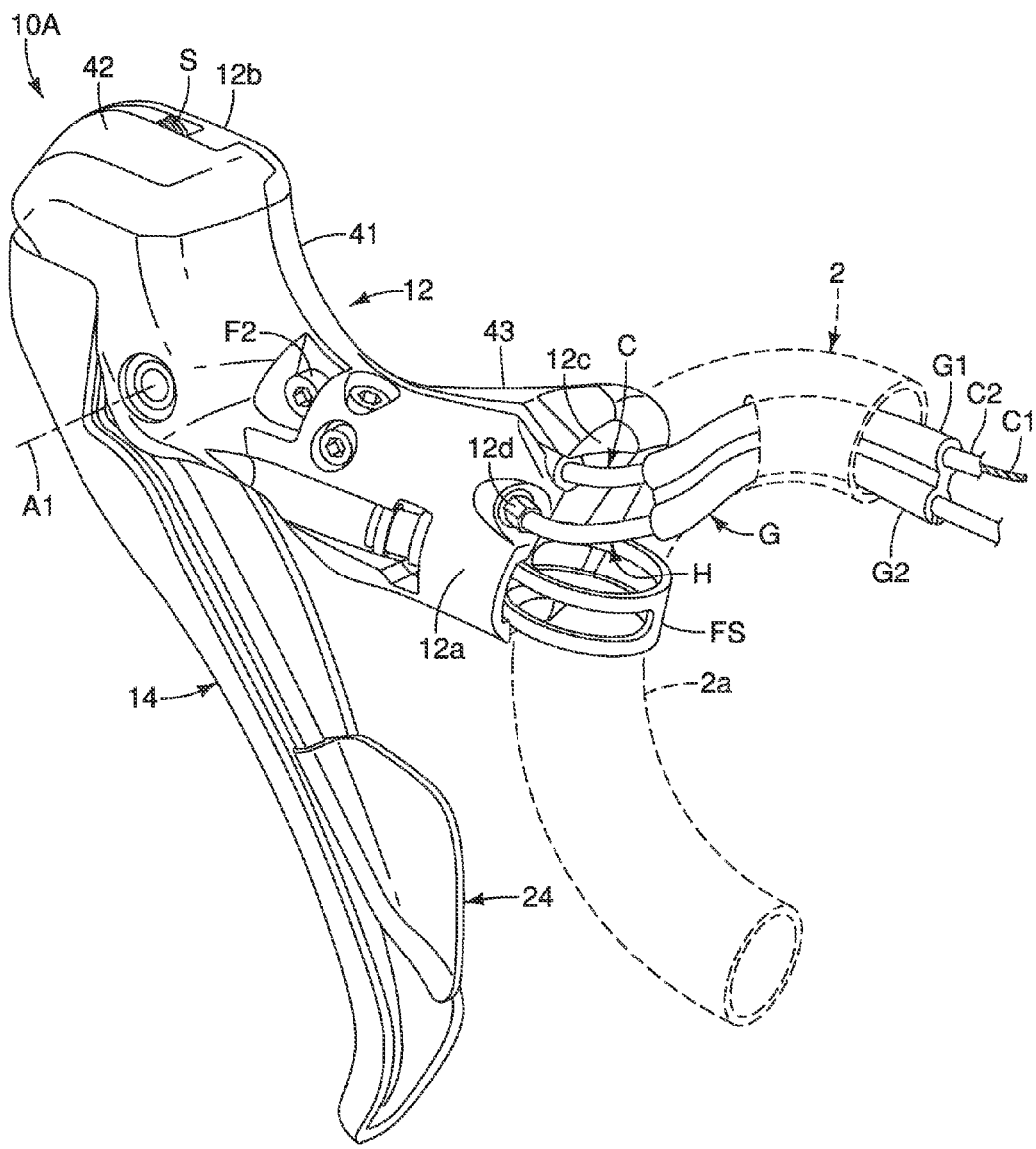
FIG. 2 is an inside perspective view of a right bicycle control device that is attached to a curved portion of the handlebar illustrated in FIG. 1.

Preferably, as seen in FIG. 1, the control cable C and the hydraulic hose H are routed through the interior of the handlebar 2. In the illustrated embodiment, the handlebar 2 is provided with a pair of guide members G. Each of the guide members G aid in guiding one of the control cables C and one of the hydraulic hoses H through the interior of the handlebar 2. As seen in FIG. 2, each of the guide members G is a flexible member that has a tube portion G1 and a C-shaped channel portion G2. The tube portion G1 is configured for receiving the outer casing C2 of the control cable C. The C-shaped channel portion G2 is configured for receiving the hydraulic hose H. The C-shaped channel portion G2 can be modified to be same shape as the tube portion G1 if needed and/or desired. Preferably, the each of the guide members G has a uniform (constant) transverse cross section along its entire length. Additional guide members, similar to guide members G, can be used to guiding the control cables C and the hydraulic hoses H through the interior of frame tubes, and the like as needed and/or desired.

Since the bicycle control devices 10A and 10B are each configured to operate both a transmission and a hydraulic brake device, the bicycle control devices 10A and 10B are also known as bicycle brifters. In other words, a bicycle brifter is a device that includes both a braking function and a shifting function in a single unit that is mounted to the bicycle. In the illustrated embodiment, the right and left bicycle control devices 10A and 10B are essentially identical in operation, except that they are mirror images of each other and they may have a different number of shift operations. Thus, only the bicycle control device 10A will be discussed and illustrated herein.

Referring to FIGS. 3 to 6, the bicycle control device 10A basically comprises a bracket 12 and an operating unit 13. The operating unit 13 basically includes a first operating member 14, a shift unit 16 and a pivot axle structure 18. Basically, the bracket 12 is configured to be coupled to the handlebar 2. In the illustrated embodiment, the bracket 12 is configured to be coupled to the curved section 2a of the handlebar 2 by a fixing structure FS. Since the fixing structure FS is conventional and well known within the bicycle field, it will not be discussed in detail herein for the sake of brevity.

Figure 3:
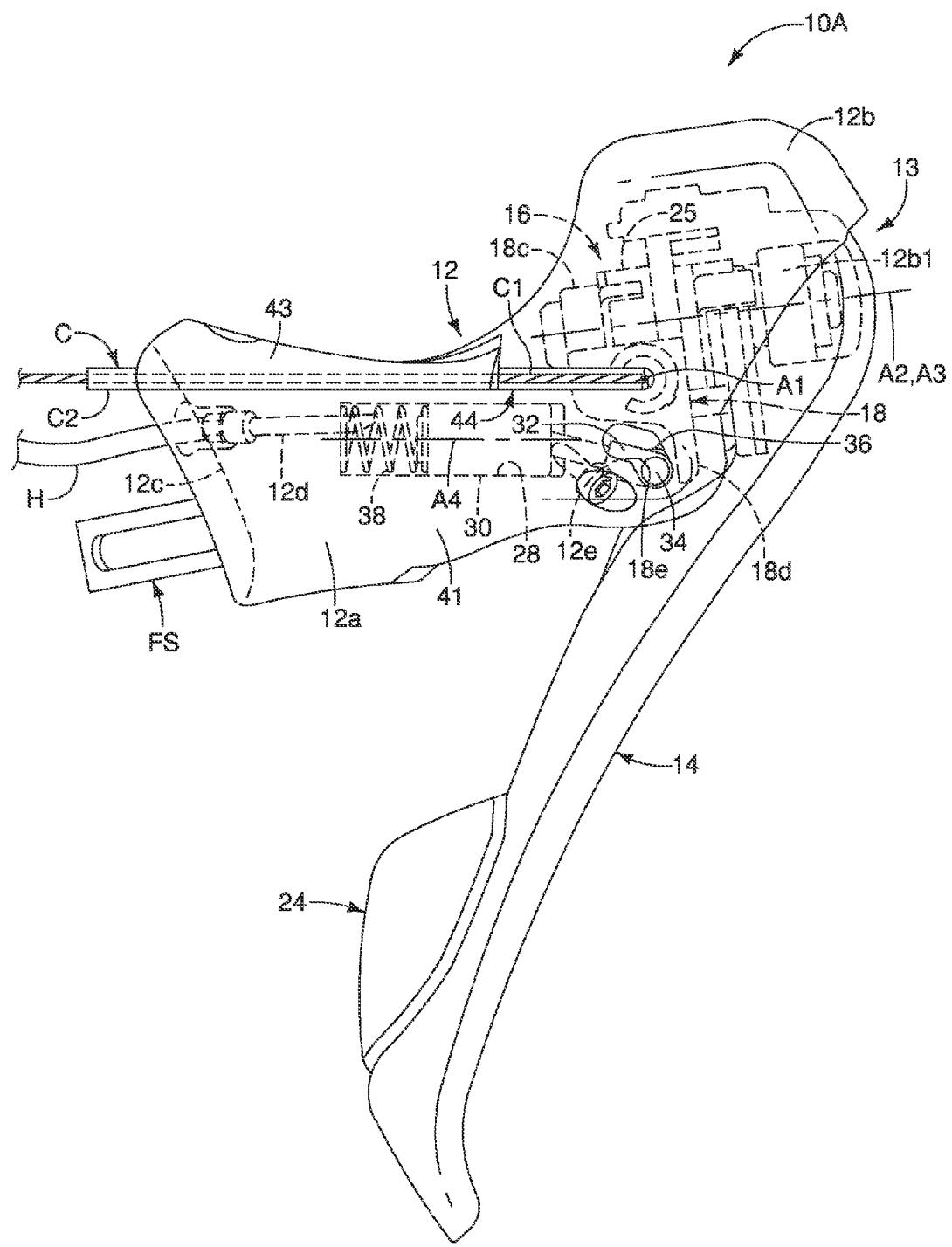
FIG. 3 is an outside elevational view of the right bicycle control device illustrated in FIGS. 1 and 2 with the first and second operating members in their rest (non-operated) positions and selected hidden parts shown in broken lines.

As seen in FIG. 4, the pivot axle structure 18 is pivotally supported by the bracket 12. Thus, as seen in FIG. 3, the operating unit 13 is configured to be pivotally mounted to the bracket 12 around a first axis A1. In other words, the pivot axle structure 18 configured to pivotally mount the operating unit 13 to the bracket 12 around the first axis A1. Since the first operating member 14 and the shift unit 16 are both attached to the pivot axle structure 18, operation of the first operating member 14 causes shift unit 16 and the pivot axle structure 18 to pivot with the first operating member 14 around the first axis A1 relative to the bracket 12. The first axis A1 corresponds to a brake operating axis in the illustrated embodiment.

In the illustrated embodiment, the first operating member 14 is an elongated lever that has one end pivotally coupled to the shift unit 16 via the pivot axle structure 18, and a user engagement portion extending outwardly from the bracket 12. In addition to being pivotally mounted to the bracket 12 about the first axis A1, the first operating member 14 is also pivotally provided on the operating unit 13 around a second axis A2. In the illustrated embodiment, the first axis A1 is located below the second axis A2 as viewed in a direction parallel to the first axis A1 in a state where the bicycle control device 10A is mounted to the handlebar 2.

Here in the illustrated embodiment, as seen in FIGS. 4 to 6, the bracket 12 has a projection 20 and an opening 22 for pivotally supporting the pivot axle structure 18 as discussed below. In this way, the pivot axle structure 18 is configured to pivotally mount the first operating member 14 and the shift unit 16 to the bracket 12 about the first axis A1. However, it will be apparent to those skilled in the bicycle field from this disclosure that the pivotally connection between the bracket 12 and the pivot axle structure 18 is not limited to this illustrated configuration. For example, the bracket 12 could have a pair of projections or a pair of opening for pivotally supporting the pivot axle structure 18.

Figure 7:
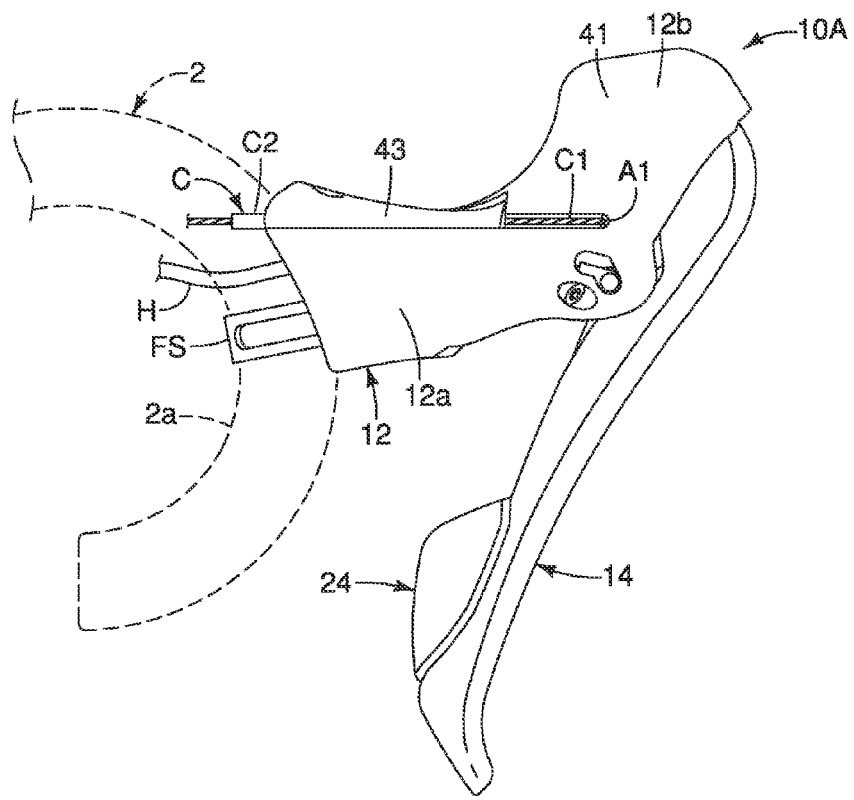
FIG. 7 is an outside elevational view, similar to FIG. 3, of the right bicycle control device illustrated in FIGS. 1 to 3 with the first and second operating members in their rest (non-operated) positions.
Figure 8:
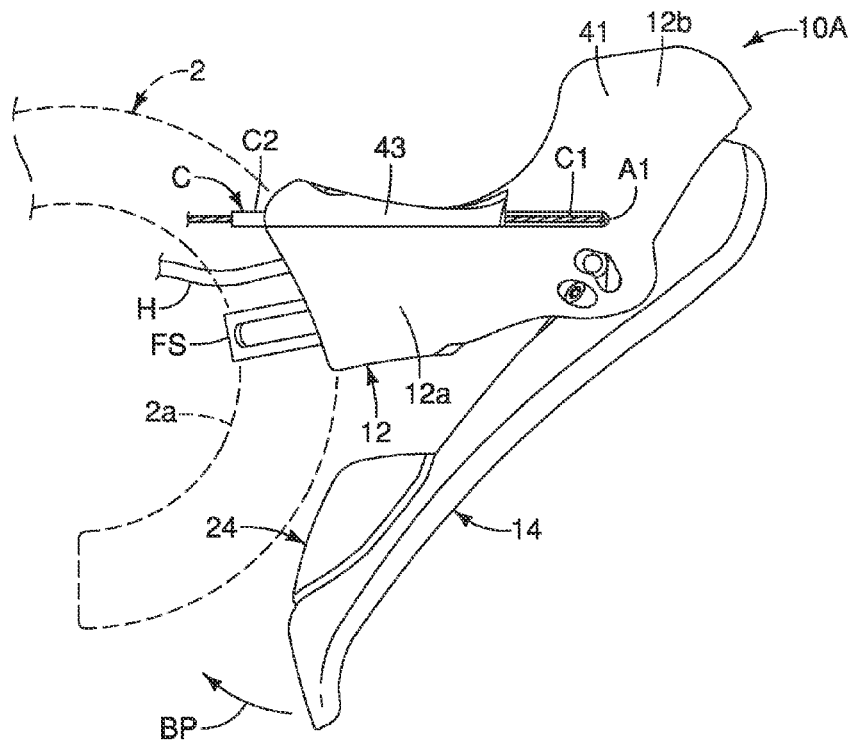
FIG. 8 is an outside elevational view, similar to FIG. 7, of the right bicycle control device illustrated in FIGS. 1 to 3 but with the first operating member (i.e., the brake-shift wire pull lever) pivoted about a first axis (i.e., a brake operating axis) to a braking position, which causes the second operating member (i.e., the shift wire release lever) to be pivoted together with the first operating member about the first axis with respect to the bracket.

As seen in FIGS. 7 and 8, the first operating member 14 is operated to perform a braking operation by pivoting of the first operating member 14 around the first axis A1 with respect to the bracket 12. In particular, during a braking operation, the first operating member 14 is pivoted around the first axis A1 with respect to the bracket 12 from a rest position (FIG. 7) to an operated position (FIG. 8). The shift unit 16 is mounted on the pivot axle structure 18. As a result, the shift unit 16 pivots with the first operating member 14 about the first axis A1 as the operating unit 13 moves from the rest position (FIG. 7) to the operated position (FIG. 8). When the shift unit 16 pivots about the first axis A1 with respect to the bracket 12, no shifting operation of the shift unit 16 occurs. However, when the first operating member 14 is pivoted about the second axis A2, the shift unit 16 is operated to move at least one shift position. In other words, the first operating member 14 is configured to operate the shift unit 16 in response to the first operating member 14 pivotally movement about the second axis A2.

FIGS. 1 to 3 and 7 illustrate the bicycle control device 10A with its various parts in their rest positions. The term "rest position" as used herein refers to a state in which a movable part (e.g., the operating unit 13 or the first operating member 14) remains stationary without the need of a user intervening (e.g., holding the movable part) to establish a state corresponding to the rest position. Thus, the term "rest position" can also be referred to as a non-operated position. The term "end position" as used herein refers a state in which a movable part (e.g., the first operating member 14) is prevent from be moved further away from the rest position in a movement direction of a movement stroke of that movable part. The term "operated position" as used herein refers a state in which a movable part (e.g., first operating member 14) is moved from the rest position to a position as a result of an external force being applied to the movable part.

In the illustrated embodiment, the operating unit 13 further includes a second operating member 24 that is pivotally provided around the second axis A2. The shift unit 16 is configured to operate the inner wire C1 in response to operation of the first and second operating members 14 and 24. Similar to the first operating member 14, the second operating member 24 is an elongated lever that has one end pivotally coupled to the shift unit 16 via the pivot axle structure 18, and a user engagement portion extending outwardly from the bracket 12. Thus, the pivot axle structure 18 is configured to pivotally mount the second operating member 24 to the bracket 12 about the first axis A1.

Figures 9, 10:
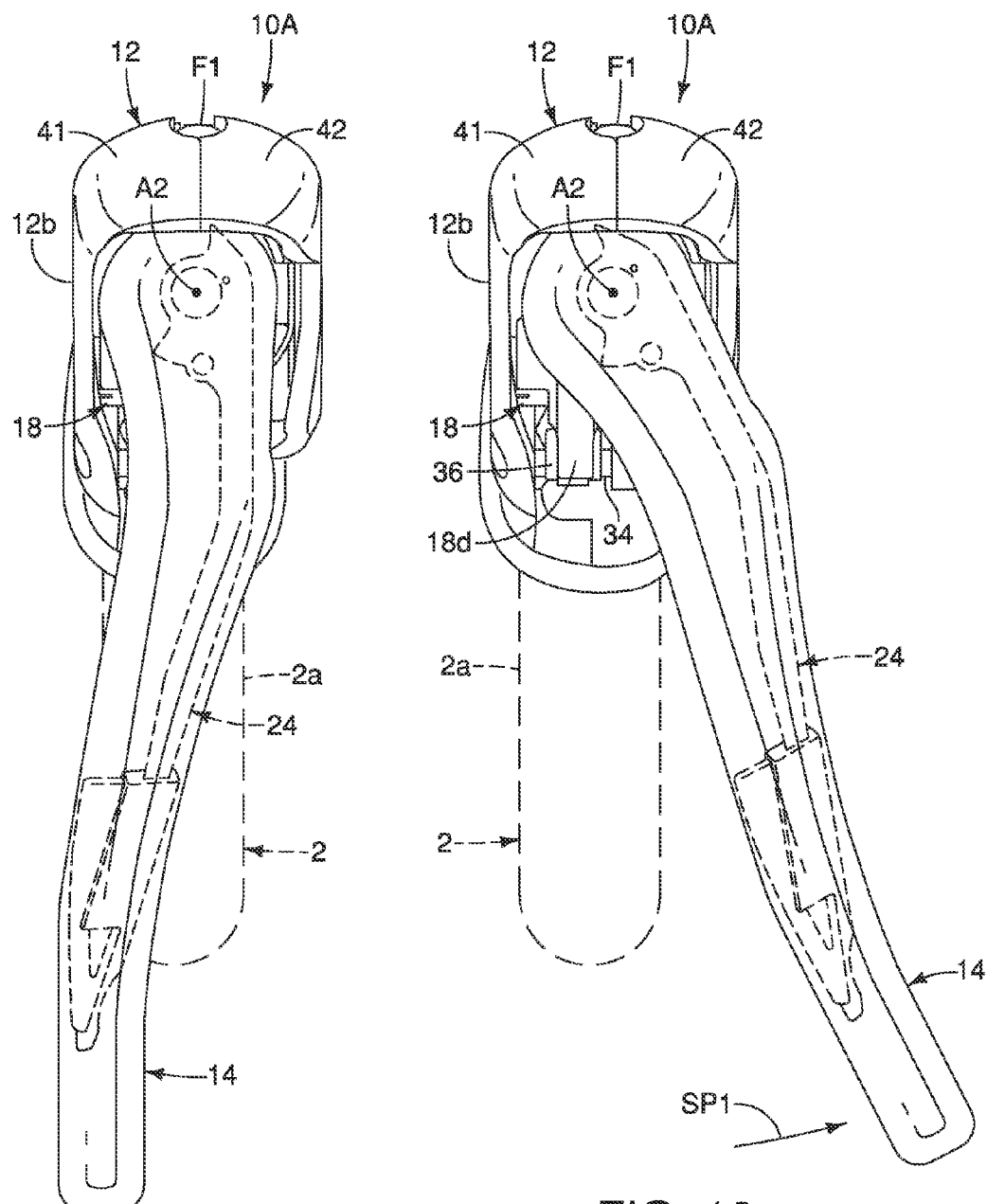
FIG. 9 is a front oblique view of the right bicycle control device illustrated in FIGS. 1 to 3 as viewed parallel to the second axis of the shift unit with the first and second operating members in their rest positions.
FIG. 10 is a front oblique view of the right bicycle control device illustrated in FIGS. 1 to 3 as viewed parallel to the second axis of the shift unit with the first operating member pivoted about the second axis to a wire pulling position, which causes the second operating member to be pivoted together with the first operating member about the second axis with respect to the bracket.
Figure 11:
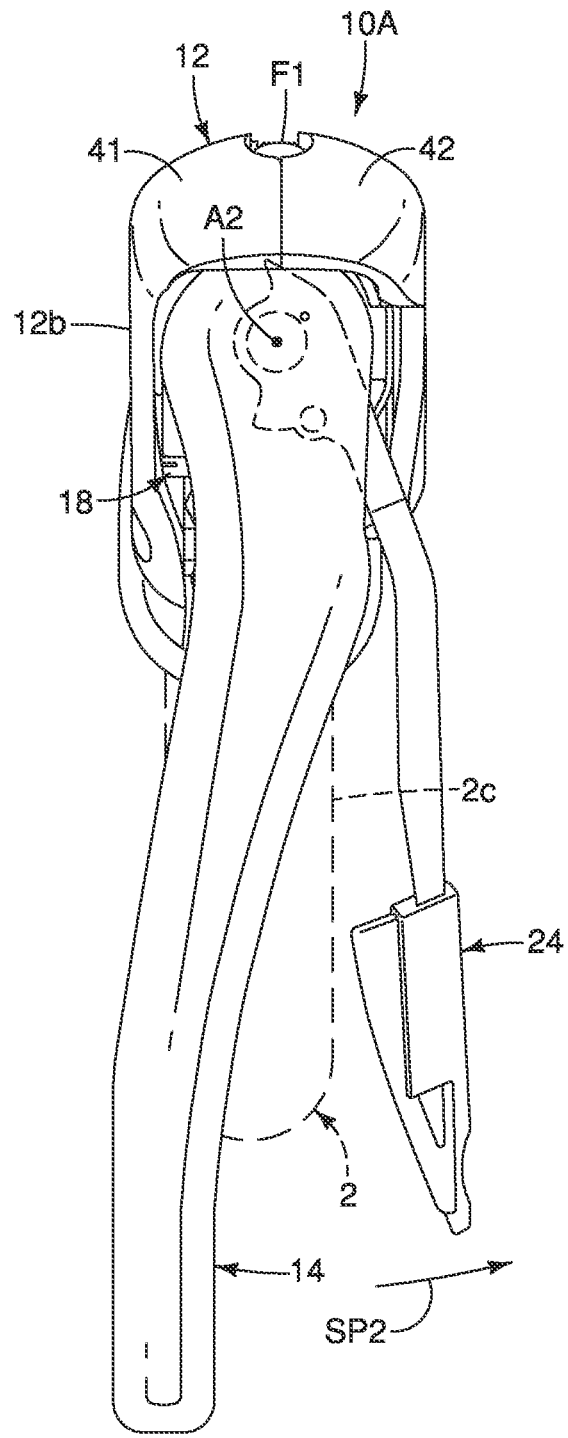
FIG. 11 is a front oblique view of the right bicycle control device illustrated in FIGS. 1 to 3 as viewed parallel to the second axis of the shift unit with the second operating member pivoted about the second axis to a wire releasing position, in which the first operating member remains stationary with respect to the bracket.

Here, the first and second operating members 14 and 24 are pivotally mounted to the pivot axle structure 18 about a second axis A2. The first and second operating members 14 and 24 are used to operate the shift unit 16 as explained below. In other words, the first and second operating members 14 and 24 are operatively coupled to the shift unit 16. In particular, as seen in FIGS. 9 to 11, pivotal movement of the first operating member 14 about the second axis A2 from the rest position (FIG. 9) to an operated position (FIG. 10) results in a wire pulling operation of the inner wire C1, while pivotal movement of the second operating member 24 about the second axis A2 from the rest position (FIG. 9) to an operated position (FIG. 11) results in a wire releasing operation of the inner wire C1. Depending on the configuration of the shift unit 16, the first operating member 14 can operate the shift unit 16 by one or more shift positions based on the stroke of the movement of the first operating member 14. Likewise, depending on the configuration of the shift unit 16, the second operating member 24 can operate the shift unit 16 by one or more shift positions based on the stroke of the movement of the second operating member 24.

The first and second operating members 14 and 24 are trigger levers that are biased to their rest positions such that the first and second operating members 14 and 24 automatically return to their rest positions upon being released from an operated position. While the bicycle control device 10A is illustrated with two operating levers, depending on the type of shift unit being used, a second operating member may not be used. In other words, the shift unit 16 can be replaced with a shift unit that only uses a single lever for both pulling and releasing the inner wire C1 of the control cable C.

In the illustrated embodiment, as seen in FIGS. 14 to 21, the shift unit 16 includes a wire operating body 25. Here, the wire operating body 25 is configured as a wire take-up member or spool. The shift unit 16 is configured to rotate the wire operating body 25 around a third axis A3 in a first direction R1 (FIG. 18) in response to movement of the first operating member 14. Also the shift unit 16 is configured to rotate the wire operating body 25 around the third axis A3 in a second direction R2 (FIG. 18) that is opposite to the first direction R1 in response to movement of the second operating member 24. In the illustrated embodiment, the third axis A3 is coaxial with the second axis A2. However, with a different type of shift unit, the third axis A3 could be offset from or transverse to the second axis A2.

Figure 18:
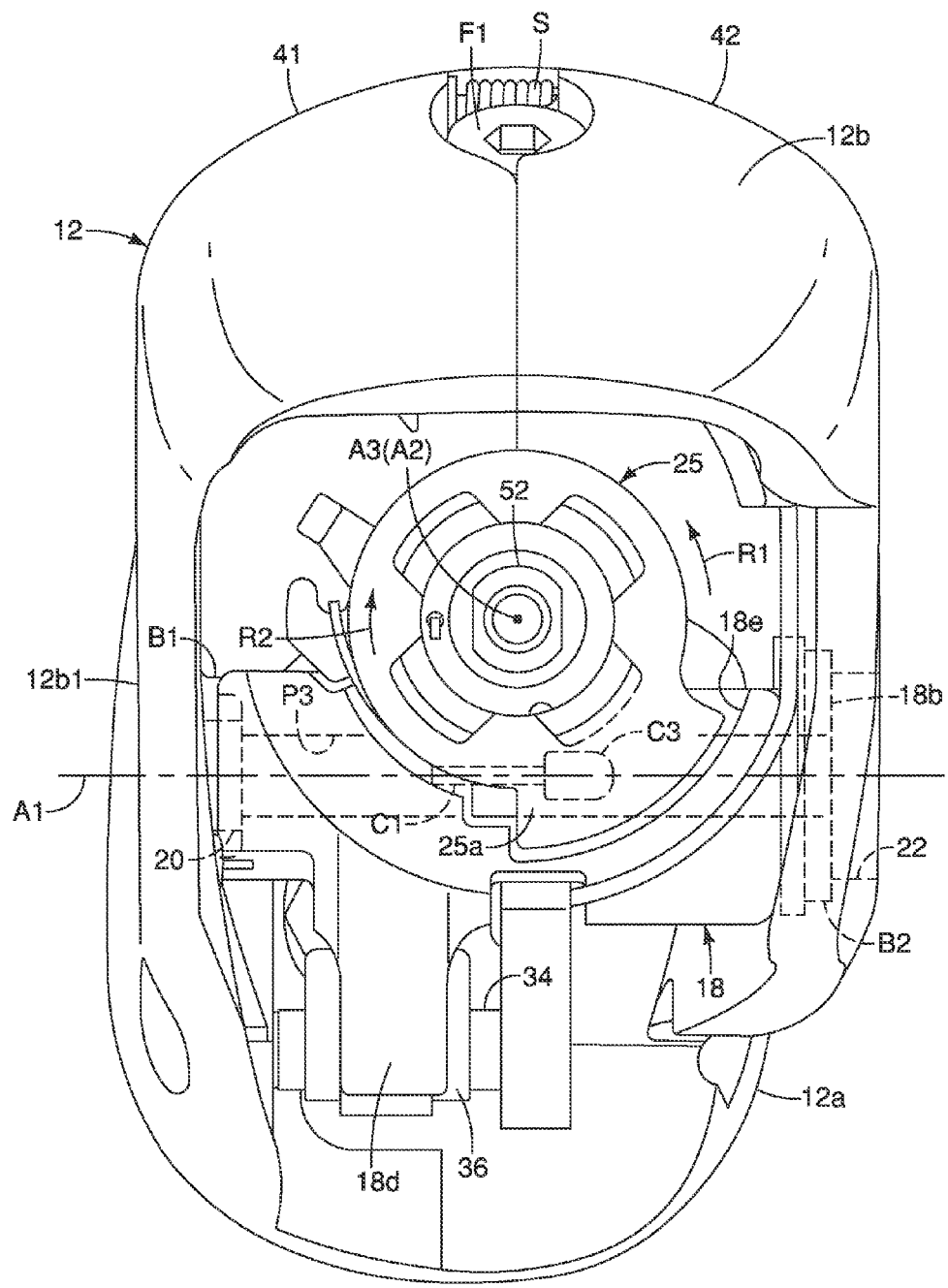
FIG. 18 is a front oblique view of the right bicycle control device illustrated in FIGS. 1 to 3 as viewed parallel to the second axis of the shift unit with selected parts removed.
Figure 19:
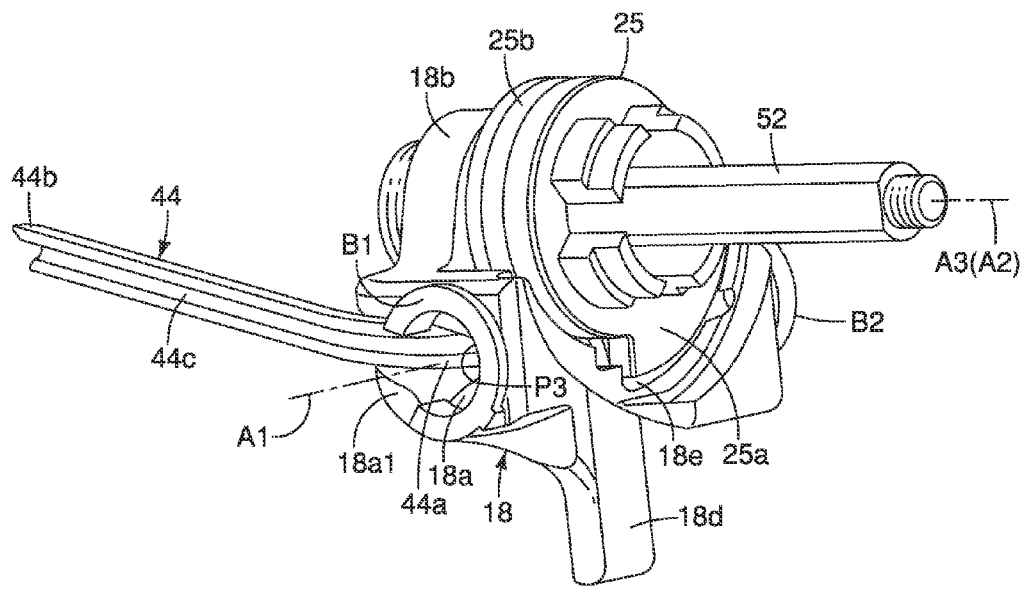
FIG. 19 is a perspective view of selected parts (i.e., the pivot axle structure, the main shift axle, the wire operating body and the wire guide member) of the right bicycle control device illustrated in FIGS. 1 to 3.
Figure 20:
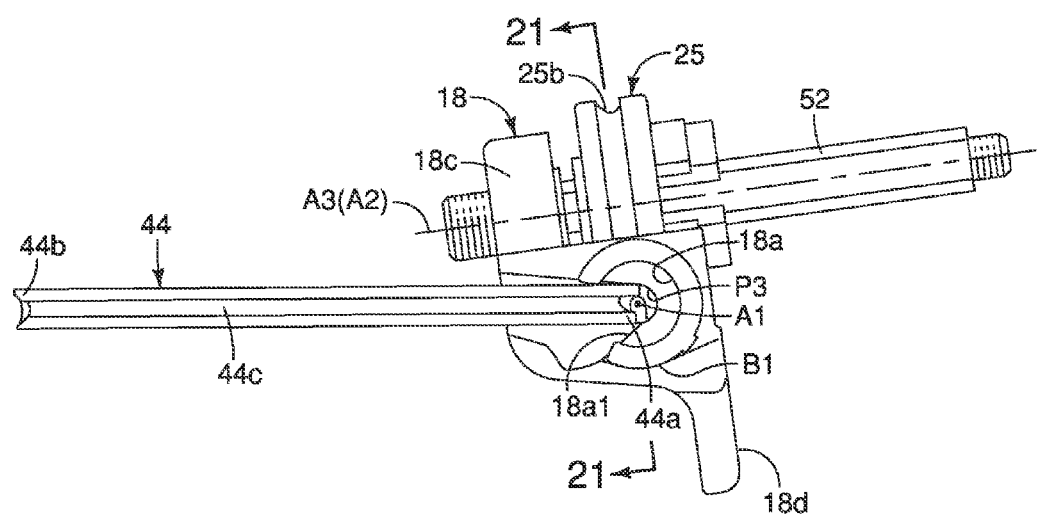
FIG. 20 is an outside elevational view of selected parts (i.e., the pivot axle structure, the main shift axle, the wire operating body and the wire guide member) of the right bicycle control device illustrated in FIGS. 1 to 3.
Figure 21:
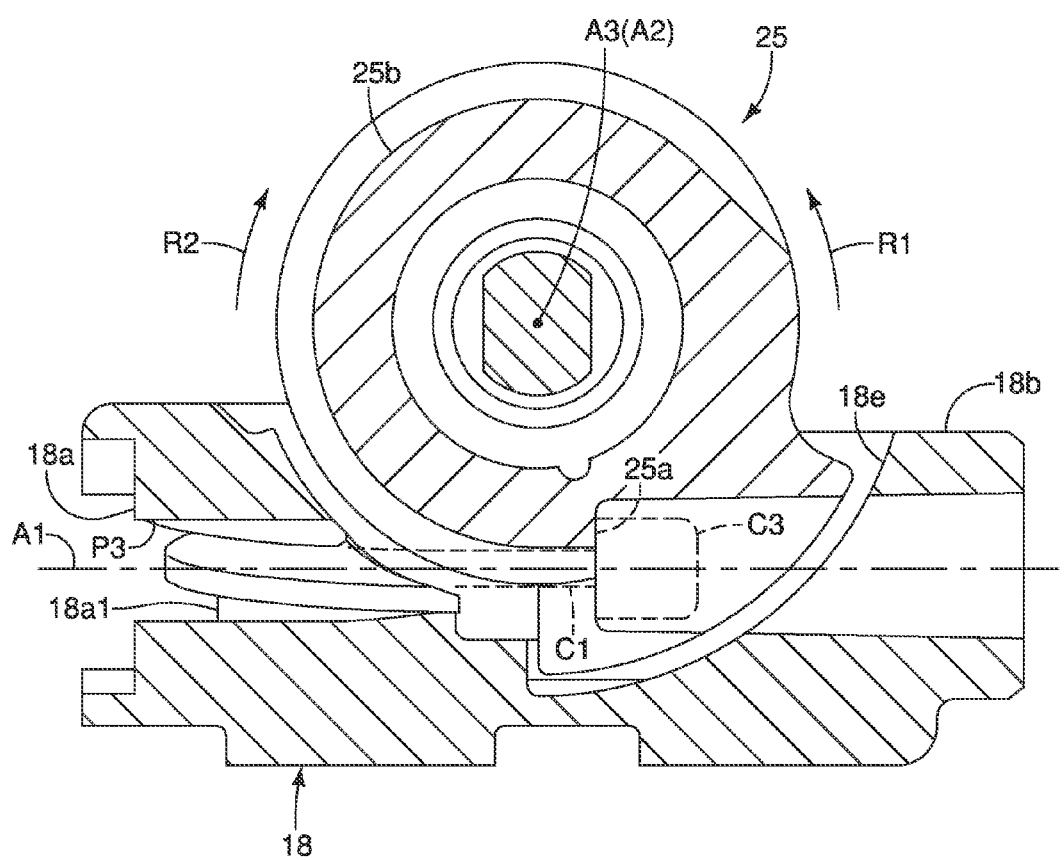
FIG. 21 is a cross sectional view of the pivot axle structure, the main shift unit axle and the wire operating body for the right bicycle control device illustrated in FIGS. 1 to 3 taken along a section line 21-21 of FIG. 20.

The wire operating body 25 has a wire connecting structure 25a for attaching the inner wire C1 to the wire operating body 25. In the illustrated embodiment, as seen in FIG. 21, the wire connecting structure 25a is basically a stepped shaped bore that receives a nipple C3 provided at an end of the inner wire C1 and a portion of the inner wire C1. It will be apparent from this disclosure that the wire connecting structure 25a can have other configurations such as a clamping screw. The wire operating body 25 also has a wire receiving groove 25b on its peripheral surface. The inner wire C1 extends from the wire connecting structure 25a, and is received in the wire receiving groove 25b as the wire operating body 25 is rotated from a fully released position (FIG. 18) in a wire pulling direction (first direction R1). As seen in FIGS. 18 and 21, the wire operating body 25 is disposed with respect to the first axis A1 such that the first axis A1 passes through a portion of the wire operating body 25.

Figure 13:
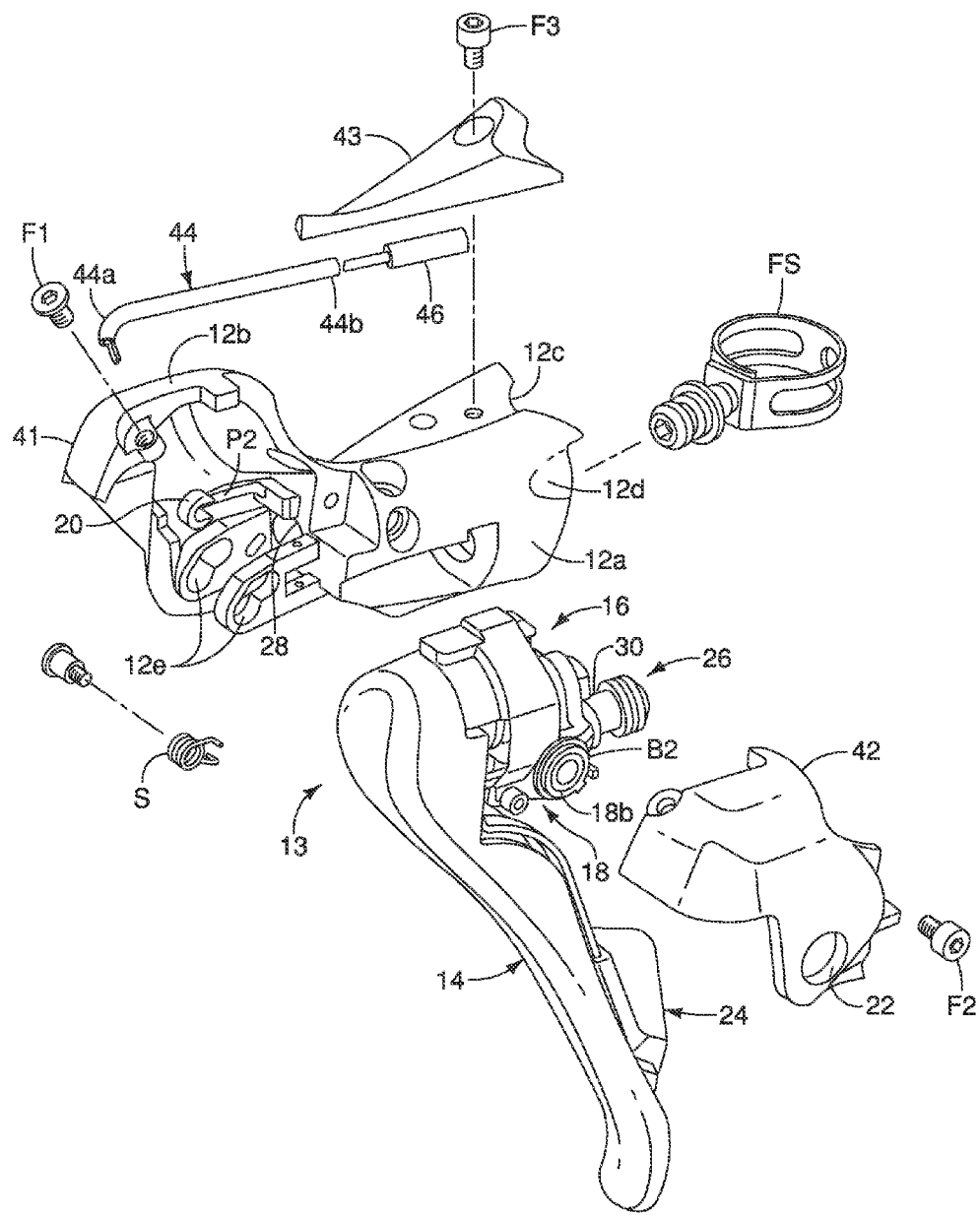
FIG. 13 is a further partially exploded perspective view of the right bicycle control device illustrated in FIGS. 1 to 3 with various parts separated from each other.
Figure 14:
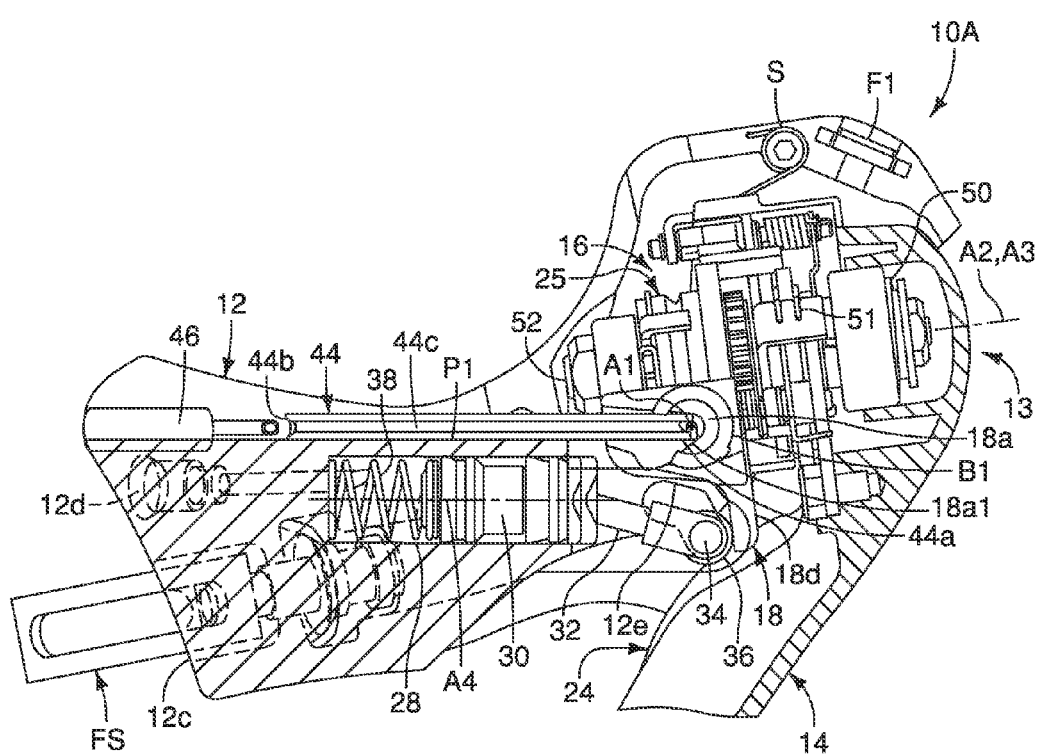
FIG. 14 is a cross sectional view of the right bicycle control device illustrated in FIGS. 1 to 3 taken along a section line passing through the center of the hydraulic unit receiving cavity of the bracket in a plane perpendicular to the first axis.
Figure 15:
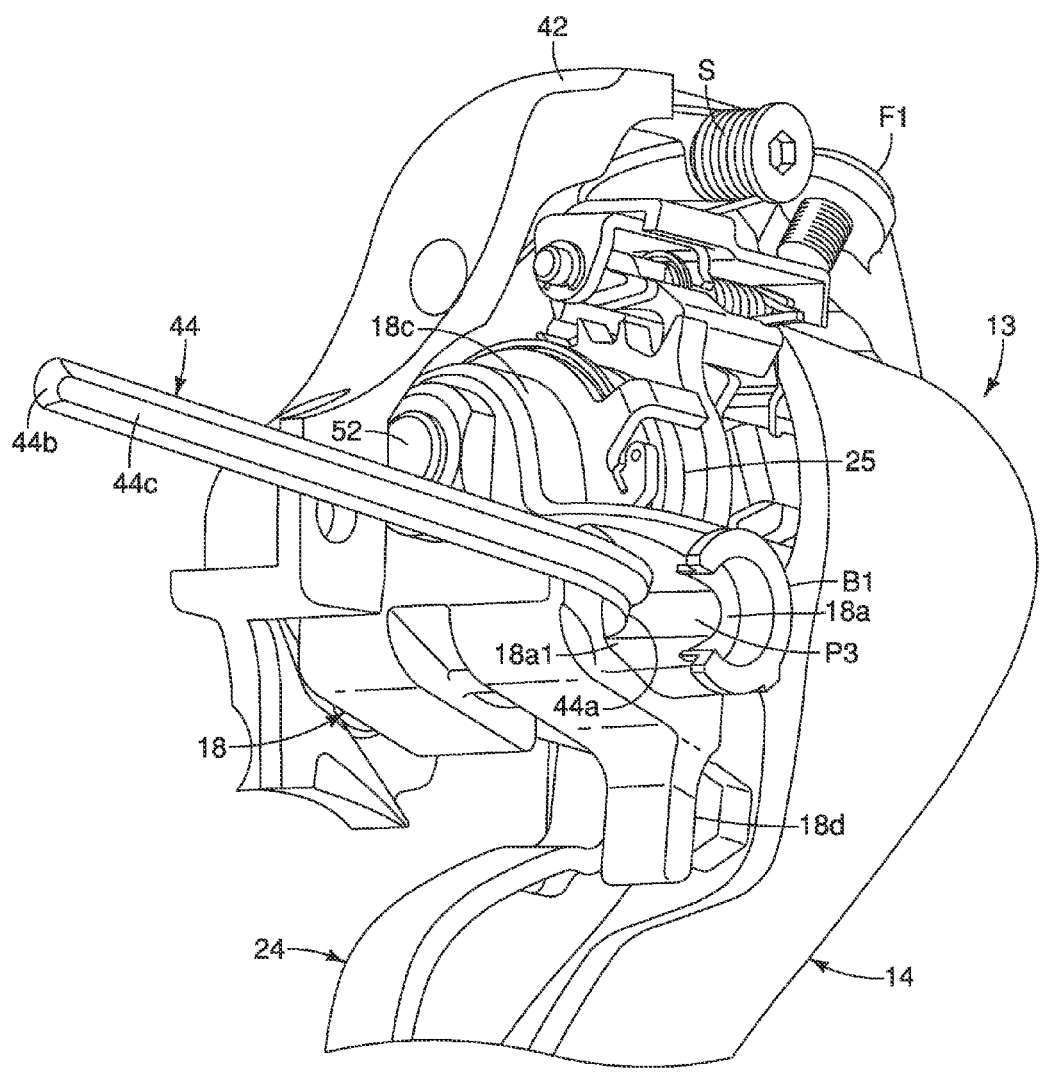
FIG. 15 is a partially perspective view of the right bicycle control device illustrated in FIGS. 1 to 3 showing the wire receiving passageway at least partially extends axially along the first axis.
Figure 16:
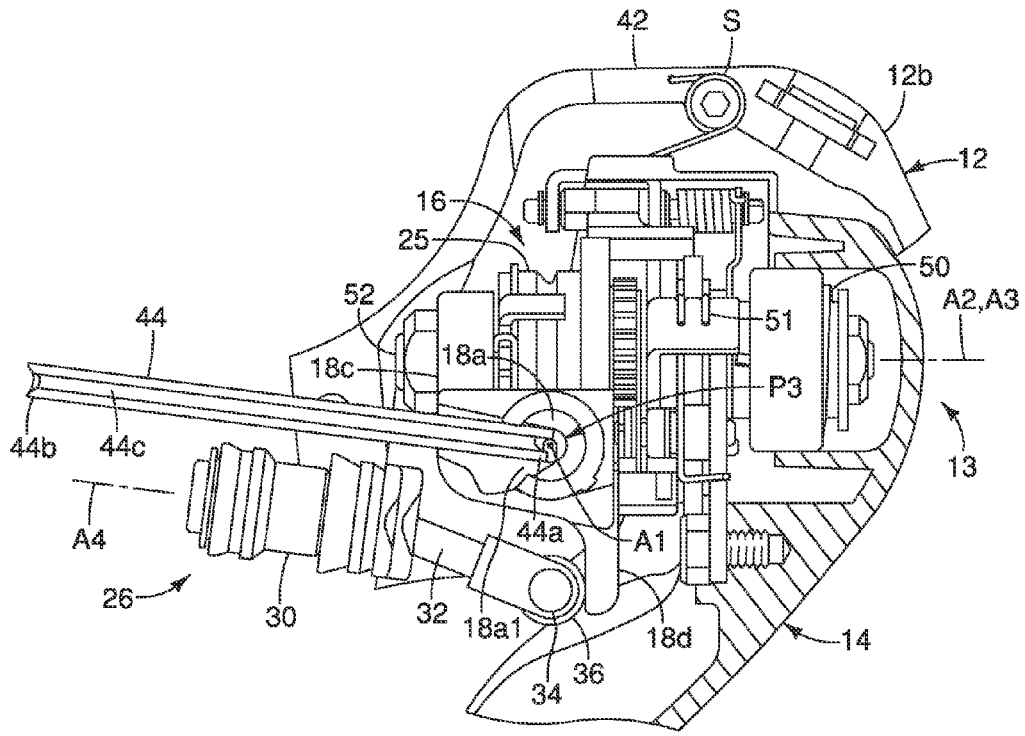
FIG. 16 is an outside elevational view of the right bicycle control device illustrated in FIGS. 1 to 3 with the first and second operating members in their rest (non-operated) positions and selected parts removed and the first operating member in cross section.
Figure 17:
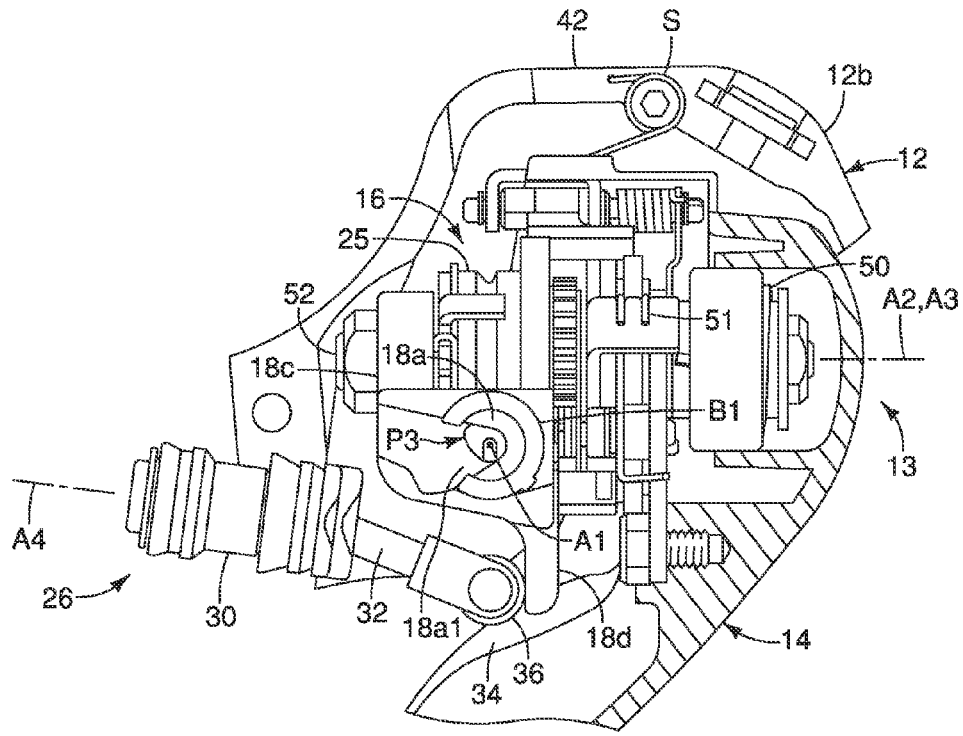
FIG. 17 is an outside elevational view, similar to FIG. 16, of the right bicycle control device illustrated in FIGS. 1 to 3 but with the wire guide member removed.

In the illustrated embodiment, as seen in FIGS. 13 and 14, the bicycle control device 10A further comprises a hydraulic unit 26. The hydraulic unit 26 is mounted to the bracket 12 to operate a hydraulic braking device (not shown), e.g. a hydraulic disc brake or a hydraulic rim brake in response to operation of the first operating member 14 around the first axis A1. The bracket 12 includes a hydraulic unit receiving cavity 28. The hydraulic unit 26 is disposed in the hydraulic unit receiving cavity 28. The hydraulic unit 26 includes a piston 30. The piston 30 moves along a fourth axis A4. The fourth axis A4 corresponds to a longitudinal moving axis in the illustrated embodiment. The fourth axis A4 is disposed below the first axis A1 as viewed in a direction parallel to the first axis A1 in a state where the bicycle control device 10A is mounted to the handlebar 2. In illustrated embodiment, the fourth axis A4 corresponds to a center axis of the hydraulic unit receiving cavity 28, which defines a hydraulic chamber for the hydraulic unit 26. Thus, a hydraulic cylinder is integrally formed by the bracket 12 for slidably receiving the hydraulic unit 26. Although the hydraulic cylinder is formed by the hydraulic unit receiving cavity 28 in the embodiment, alternatively, the hydraulic cylinder can be a separate pipe member that is inserted into the hydraulic unit receiving cavity 28. Also optionally, the hydraulic unit 26 can further include a reservoir unit that fluidly communicates with the interior of the hydraulic unit receiving cavity 28.

The hydraulic unit 26 further includes a piston rod 32 that operatively connects the first operating member 14 to the piston 30. Thus, the hydraulic unit 26 is operatively coupled to the operating unit 13. Specifically, the hydraulic unit 26 is operatively coupled the first operating member 14 via the pivot axle structure 18. The piston 30 is moved in a direction away from the first axis A1 as the operating unit 13 moves from the rest position (FIG. 7) to the operated position (FIG. 8). In other words, pivoting of the operating unit 13 via the first operating member 14 around the first axis A1 from the rest position (FIG. 7) to the operated position (FIG. 8) results in a braking operation by pushing the piston 30 within the hydraulic unit receiving cavity 28. In the illustrated embodiment, the piston rod 32 has a first end that is provided with a guide pin 34 and a roller 36. The piston rod 32 has a second end that is pivotally coupled to the piston 30. The ends of the guide pin 34 are movably supported by the bracket 12 such that the first end of the piston rod 32 is supported on the bracket 12. The roller 36 contacts the pivot axle structure 18 such that the roller 36 is pushed by the pivot axle structure 18 as the pivot axle structure 18 pivots about the first axis A1. In this way, the first operating member 14 is connected to the piston 30 that is disposed in the hydraulic unit receiving cavity 28 to move the piston 30 as the first operating member 14 is pivoted around the first axis A1. Thus, the piston 30 is movably arranged in the hydraulic unit receiving cavity 28 for reciprocal movement along the fourth axis A4. As seen in FIG. 14, the piston 30 of the hydraulic unit 26 is mounted to the bracket 12 at a location that is closer to the handlebar 2 than the shift unit 16 in a state where the bicycle control device 10A is mounted to the handlebar 2.

The hydraulic unit 26 further includes a biasing element 38 that is disposed inside the hydraulic unit receiving cavity 28 between a closed end wall of the hydraulic unit receiving cavity 28 and the piston 30. The biasing element 38 biases the piston 30 to a non-braking position. The biasing element 38 also acts as a return spring for biasing the operating unit 13 to its rest position with respect to the first axis A1. Here, the biasing element 38 is a coil compression spring.

Referring to FIGS. 2, 7, 8 and 11 to 14, the bracket 12 includes a gripping portion 12*a* and a shift unit housing portion 12*b*. A handlebar coupling surface 12*c* is disposed at a proximal end of the gripping portion 12*a*. The shift unit housing portion 12*b* is disposed at a distal end of the gripping portion 12*a*. In the illustrated embodiment, the shift unit housing portion 12*b* of the bracket 12 extends from the gripping portion 12*a* to define a pommel or horn, which aids in preventing the rider's hand from moving in a forward direction on the gripping portion 12*a*. Thus, as used herein, the gripping portion 12*a* refers to the portion of the bracket 12 from the handlebar coupling surface 12*c* to the point that the bracket 12 slopes more upwardly than horizontally in a state in which the bicycle control device 10A is mounted to the handlebar 2.

Figure 12:
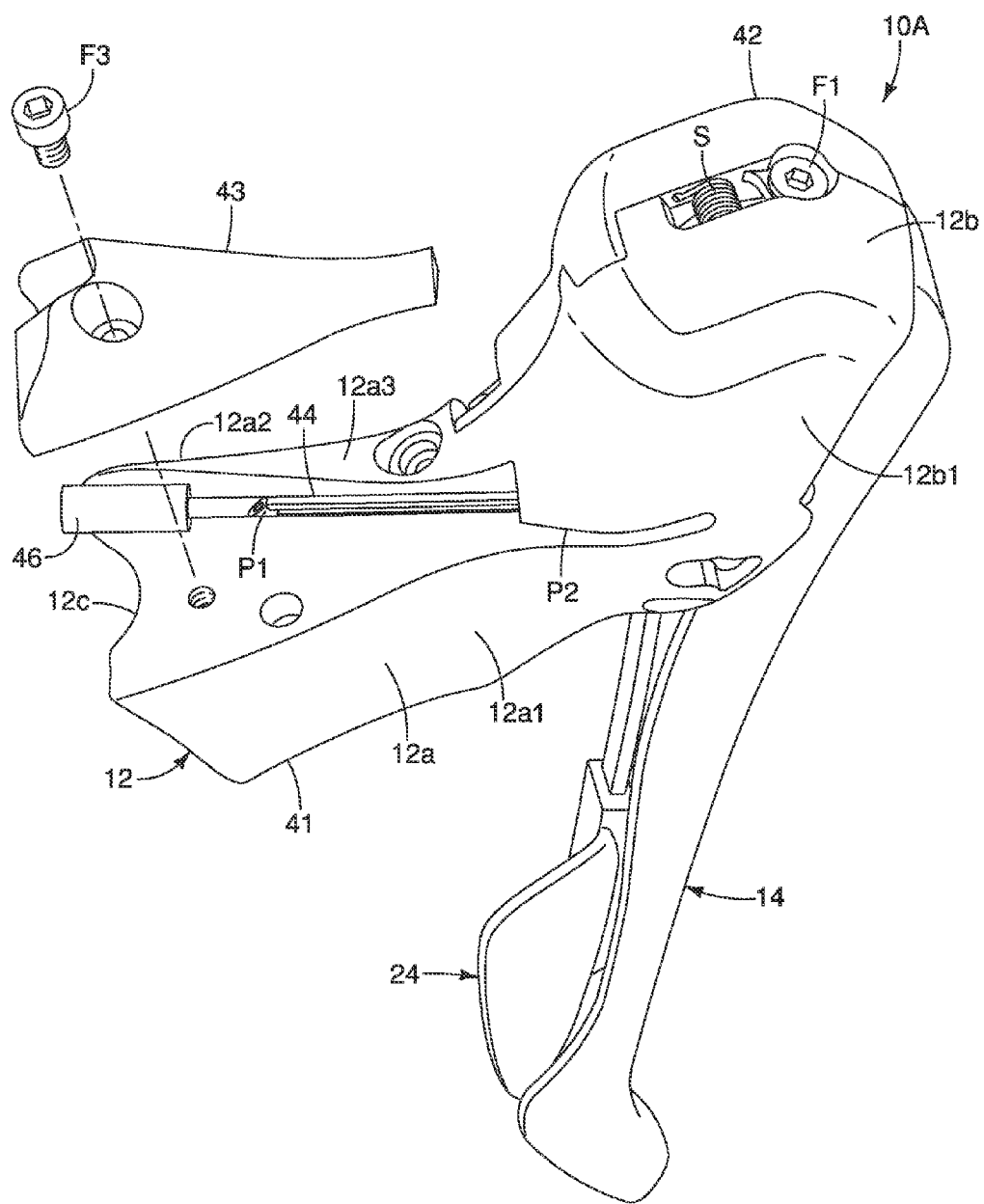
FIG. 12 is a partially exploded perspective view of the right bicycle control device illustrated in FIGS. 1 to 3 with the third bracket part separated from the first and second bracket parts to show the path of the control wire of the shift unit.

Referring to FIG. 12, the gripping portion 12*a* includes a first wire receiving pathway P1. The shift unit housing portion 12*b* includes a second wire receiving pathway P2 communicating with the first wire receiving pathway P1. The gripping portion 12*a* has a pair of side surfaces 12*a*1 and 12*a*2 and an upper surface 12*a*3 that extends laterally between the side surfaces 12*a*1 and 12*a*2. The upper surface 12*a*3 includes the first wire receiving pathway P1. The shift unit housing portion 12*b* has a laterally facing surface 12*b*1 that includes the second wire receiving pathway P2. As used herein, the upper surface 12*a*3 is defined by an area of the gripping portion 12*a* that is visibly when viewed from above the bracket 12 in a state in which the bicycle control device 10A is mounted to the handlebar 2. Thus, the side surfaces 12*a*1 and 12*a*2 are not visibly when viewed from above the bracket 12 in a state in which the bicycle control device 10A is mounted to the handlebar 2.

As seen in FIGS. 6 and 14, the bracket 12 further includes a fluid outlet 12*d* that is in fluid communication with the interior of the hydraulic unit receiving cavity 28. The fluid outlet 12*d* is located adjacent to the handlebar coupling surface 12*c*. The hydraulic hose H is connected to the fluid outlet 12*d* with a conventional connection (e.g., a threaded fitting. The hydraulic unit receiving cavity 28 is in fluid communication with the hydraulic braking device (not shown) via the hydraulic hose H to operate the hydraulic braking device in response to movement of the piston 30 from the rest position (FIG. 7) to the actuated position (FIG. 8).

Referring to FIGS. 13 and 14, the bracket 12 further includes a pair of arcuate slots 12*e* for supporting the ends of the guide pin 34 and controlling the movement of the piston rod 32 as the operating unit 13 pivots about the first axis A1. In this way, the piston rod 32 has one end coupled to the piston 30 and the other end supported by the bracket 12. Also, with this arrangement, the operating unit 13 can be detached as an integrated unit from the bracket 12 without removing the hydraulic unit 26.

In the illustrated embodiment, as seen in FIGS. 12 and 13, the bracket 12 includes a first bracket part 41 and a second bracket part 42. The first and second bracket parts 41 and 42 are hard, rigid members that are made of a suitable material such as a hard rigid plastic material. The first and second bracket parts 41 and 42 define the shift unit housing portion 12*b* of the bracket 12, which houses the shift unit 16. The first and second bracket parts 41 and 42 are detachable and reattachable with respect to each other without damaging the bracket 12. Thus, the second bracket part 42 is a separate member that is attached to the first bracket part 41. In this way, the operating unit 13 can be detached as an integrated unit from the bracket 12. In the illustrated embodiment, the first and second bracket parts 41 and 42 are attached together by a pair of fasteners F1 and F2. By making the shift unit housing portion 12*b* out of two pieces (i.e., the first and second bracket parts 41 and 42) and using fasteners F1 and F2, the operating unit 13 can be easily installed and removed for servicing as needed and/or desired.

In the illustrated embodiment, the first bracket part 41 includes the projection 20, while the second bracket part 42 includes the opening 22. In this way, the first and second bracket parts 41 and 42 pivotally support the pivot axle structure 18. Since the first operating member 14 and the shift unit 16 are mounted on the pivot axle structure 18 in the operating unit 13, the first operating member 14 and the shift unit 16 are pivotally supported between the first and second bracket parts 41 and 42 by the pivot axle structure 18. In the illustrated embodiment, a biasing member S in the form of a torsion spring is also provided between the bracket 12 and the operating unit 13 to bias the operating unit 13 towards the rest position. The biasing member S takes up any pivotal play in the operating unit 13 about the first axis A1.

In the illustrated embodiment, the bracket 12 further includes a third bracket part 43 that is attached to the first bracket part 41 in a detachable and reattachable manner without damaging the bracket 12. In the illustrated embodiment, the first and third bracket parts 41 and 43 are attached together by a fastener F3. The third bracket part 43 is a hard, rigid member that is made of a suitable material such as a hard rigid plastic material. The first and third bracket parts 41 and 43 mainly define the gripping portion 12*a* of the bracket 12. However, in the illustrated embodiment, a small section of the second bracket part 42 also defines a small portion of the gripping portion 12*a*. The upper surface 12*a*3 of the gripping portion 12*a* is mainly defined by the first and third bracket parts 41 and 43. The first wire receiving pathway P1 is formed in the first bracket part 41 with the third bracket part 43 partially overlying the first wire receiving pathway P1. The first wire receiving pathway P1 extends in a direction transverse to the first axis A1. The side surface 12*a*1 of the gripping portion 12*a* is defined by the first bracket part 41. The side surface 12*a*2 is mainly defined by the first bracket part 41.

As seen in FIGS. 12 to 16, the bicycle control device 10A further comprises a wire guide member 44 disposed on the bracket 12. In particular, the wire guide member 44 is disposed in the first wire receiving pathway P1 that is formed in the first bracket part 41. The wire guide member 44 extends transverse to the first axis A1. Preferably, the wire guide member 44 is made of a material having a lower coefficient of friction than the coefficient of friction of the material of the bracket 12. The wire guide member 44 has a first end 44*a* located adjacent the first axis A1. The wire guide member 44 has a second end 44*b* located closer to the handlebar coupling surface 12*c* than to the first axis A1.

In the illustrated embodiment, the bicycle control device 10A further comprises a cable receiving member 46. The cable receiving member 46 is also disposed in the first wire receiving pathway P1 that is formed in the first bracket part 41. The cable receiving member 46 is an insert that has a first tubular portion dimensioned for receiving the outer casing C2 of the control cable C and a second tubular portion dimensioned for receiving the inner wire C1 of the control cable C. Preferably, the cable receiving member 46 is configured for guiding the inner wire C1 of the control cable C to a guiding groove of the wire guide member 44.

Referring to FIGS. 7 to 11, the movements of the first and second operating members 14 and 24 will now be discussed. The first operating member 14 is pivotally mounted relative to the bracket 12 around the first axis A1 to operate the hydraulic unit 26. The first operating member 14 is further configured to be pivoted around the second axis A2 that is different from the first axis A1 to actuate the shift unit 16. The second operating member 24 is also pivotally mounted relative to the bracket 12 around the second axis A2 to operate the shift unit 16. With this configuration, the first operating member 14 is configured to perform a braking operation when moved along a braking path BP (FIG. 8) generally parallel to a center longitudinal plane of the bicycle 1. Also with this configuration, the first operating member 14 is configured to perform a wire pulling operation when moved along a first shifting path SP1 (FIG. 10) towards the center longitudinal plane of the bicycle 1. On the other hand, the second operating member 24 is configured to perform a wire releasing operation when moved along a second shifting path SP2 (FIG. 11) towards the center longitudinal plane of the bicycle 1.

Referring to FIGS. 13 to 17, the shift unit 16 operates a first transmission (not shown), e.g. a front derailleur, a rear derailleur, or an internal transmission device in response to actuation of the first and second operating members 14 and 24. The shift unit 16 is constructed as a mechanical shift unit that is configured to pull and release the inner wire C1 of the control cable C to operate the first transmission. Thus, the shift unit 16 is operatively coupled to the first transmission via the control cable C. The shift unit 16 pulls or releases the inner wire C1 in response to operation of the first and second operating members 14 and 24. Here, in the illustrated embodiment, operation of the first operating member 14 cause the shift unit 16 to pull the inner wire C1, while operation of the second operating member 24 cause the shift unit 16 to release the inner wire C1. In other words, the first operating member 14 is pivoted about the second axis A2 from the rest position (FIG. 9) to the operated position (FIG. 10) to perform a wire pulling operation of the inner wire C1, while the second operating member 24 is pivoted about the second axis A2 from the rest position (FIG. 9) to the operated position (FIG. 11) to perform a wire releasing operation of the inner wire C1.

The shift unit 16 is provided with a first biasing member 50 that biases the first operating member 14 about the second axis A2 towards the rest position (FIG. 9). The shift unit 16 is also provided with a second biasing member 51 that biases the second operating member 24 about the second axis A2 towards the rest position (FIG. 9). In this way, the first and second operating members 14 and 24 are trigger levers. In the illustrated embodiment, the first biasing member 50 is a torsion spring having a coil portion disposed around the second axis A2 with a first spring end engaged with the first operating member 14 and a second end engaged with a stationary part of the shift unit 16. Similarly, the second biasing member 51 is a torsion spring having a coiled portion disposed around the second axis A2 with a first spring end engaged with the second operating member 24 and a second end engaged with a stationary part of the shift unit 16. However, the coiled portion of the second biasing member 51 is a flat coil that lies in a single plane, while the coiled portion of the first biasing member 50 extends axially along the second axis A2 as the coiled portion spirals around the second axis A2.

Since mechanical shift units, similar to the shift unit 16, are conventional and well known within the bicycle field, the shift unit 16 will not be described and/or illustrated in further detail herein for the sake of brevity. Basically, the shift unit 16 operates to pull and release the inner wire C1 in response to operation of the first and second operating members 14 and 24 in the same manner as the shift operating unit that is described in U.S. Patent Application Publication No. 2012/0297919. However, the mounting of the shift unit 16 to the bracket 12 is different from the shift control mechanism disclosed in this U.S. Patent Publication. Here, the shift unit 16 is mounted to the bracket 12 via the pivot axle structure 18. Also the shift unit 16 further differs from the shift operating unit disclosed in this U.S. Patent Publication in that the first and second operating members 14 and 24 are both pivotally mounted directly on the same pivot axis (i.e., the second axis A2 in the illustrated embodiment). Thus, in the shift unit 16 of the illustrated embodiment, a pull pawl is mounted on a plate that is directly attached to the first operating member 14, and a release pawl is directly attached to the second operating member 24.

As mentioned above, the shift unit 16 is at least partially disposed between the first bracket part 41 and the second bracket part 42. The shift unit 16 further includes a main shift axle 52 that is attached to the pivot axle structure 18. The main shift axle 52 defines the second axis A2 of the first and second operating members 14 and 24. The third axis A3 of the wire operating body 25 is defined by the main shift axle 52. Thus, the third axis A3 is coaxial with the second axis A2. In the illustrated embodiment, the third axis A3 is disposed above the fourth axis A4 as viewed in a direction parallel to the first axis A1 in a state where the bicycle control device 10A is mounted to the handlebar 2. The first axis A1 is located between the fourth axis A4 and the third axis A3 as viewed in a direction parallel to the first axis A1.

As seen in FIGS. 18 to 21, the pivot axle structure 18 will now be discussed. The pivot axle structure 18 is a rigid member made of a suitable material. The pivot axle structure 18 includes a first mounting end 18a and a second mounting end 18b. The pivot axle structure 18 defines a wire receiving passageway P3 for the inner wire C1. The wire receiving passageway P3 extends through the first and second mounting ends 18a and 18b along the first axis A1. However, the pivot axle structure 18 could be configured so that the wire receiving passageway P3 only extends through the first mounting end 18a. Thus, the wire receiving passageway P3 at least partially extends along the first axis A1 (FIG. 21). However, by having the wire receiving passageway P3 extends through both the first and second mounting ends 18a and 18b, the inner wire C1 can be more easily attached to the wire operating body 25. Here, the first mounting end 18a of the pivot axle structure 18 has a wire access opening 18a1 that is offset from the first axis A1 and communicates with the wire receiving passageway P3. The wire guide member 44 has the first end 44a disposed within the wire access opening 18a1 of the pivot axle structure 18. In this way, the inner wire C1 is guided from the wire operating body 25 through the wire receiving passageway P3 to the wire guide member 44. The wire access opening 18a1 has a funnel shaped configuration that the wire guide member 44 does not interfere with the pivotal movement of the pivot axle structure 18.

Here, in the illustrated embodiment, the first mounting end 18a defines a recess for pivotally receiving the projection 20 of the first bracket part 41. Thus, the first bracket part 41 pivotally supports the first mounting end 18a of the pivot axle structure 18. Here, in the illustrated embodiment, the second mounting end 18b defines a projection for pivotally engaging the opening 22 of the second bracket part 42. Thus, the second bracket part 42 pivotally supports the second mounting end 18b of the pivot axle structure 18. To aid in the pivoting of the pivot axle structure 18 relative to the bracket 12, the first mounting end 18a is provided with a first bushing B1 and the second mounting end 18b is provided with a second bushing B2. The first bushing B1 is disposed in the recess defined by the first mounting end 18a and disposed on projection 20 of the first bracket part 41. The second bushing B2 is disposed on the projection defined by the second mounting end 18b and disposed in the opening 22 of the second bracket part 42.

The pivot axle structure 18 further includes a shift unit attachment portion 18c. The shift unit attachment portion 18c is attached to the main shift axle 52 of the shift unit 16. In this way, the shift unit 16 is supported on the pivot axle structure 18 to pivot with the first operating member 14 and the pivot axle structure 18 about the first axis A1. The main shift axle 52 pivotally supports the wire operating body 25 and other parts of the shift unit 16 on the pivot axle structure 18 for pivotal movement about the third axis A3.

The pivot axle structure 18 further includes a piston rod contact member 18d. The piston rod contact member 18d contacts the roller 36 for moving the piston 30 in response to operation of the first operating member 14 about the first axis A1 from the rest position (FIG. 7) to the operated position (FIG. 8). In this way, the pivotal moment of the pivot axle structure 18 about the first axis A1 causes the piston 30 to be moved along the fourth axis A4 via the piston rod 32.

A wire operating body receiving recess 18e is preferably formed in the shift unit attachment portion 18c and the piston rod contact member 18d between the first and second mounting ends 18a and 18b. The wire operating body receiving recess 18e intersects with the wire receiving passageway P3. In this way, the portion of the wire operating body 25 that is located in the wire operating body receiving recess 18e intersects with the wire receiving passageway P3.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
    a bracket configured to be coupled to a handlebar; and
    an operating unit configured to be pivotally mounted to the bracket around a first axis, the operating unit including:
        a shift unit configured to operate a wire;
        a first operating lever configured to operate the shift unit, the first operating lever being elongated in a direction away from the first axis; and
        a pivot axle structure configured to pivotally mount the operating unit to the bracket around the first axis, the pivot axle structure defining a wire receiving passageway for the wire, an entirety of the wire receiving passageway in the pivot axle structure being substantially parallel to the first axis.

2. The bicycle control device according to claim 1, wherein the wire receiving passageway at least partially extends along the first axis.

3. The bicycle control device according to claim 1, wherein the shift unit includes a wire operating body having a wire connecting structure, the wire operating body being disposed such that the first axis passes through a portion of the wire operating body.

4. The bicycle control device according to claim 3, wherein the first operating lever is pivotally provided on the operating unit around a second axis, and
    the shift unit is configured to rotate the wire operating body around a third axis in a first direction in response to movement of the first operating lever.

5. The bicycle control device according to claim 4, wherein the operating unit further includes a second operating member pivotally provided around the second axis, and the shift unit is configured to rotate the wire operating body around the third axis in a second direction being opposite to the first direction in response to movement of the second operating member.

6. The bicycle control device according to claim 4, wherein the first axis is located below the second axis as viewed in a direction parallel to the first axis in a state where the bicycle control device is mounted to the handlebar.

7. The bicycle control device according to claim 6, wherein the third axis is coaxial with the second axis.

8. The bicycle control device according to claim 1, wherein the pivot axle structure has a wire access opening offset from the first axis and communicating with the wire receiving passageway.

9. The bicycle control device according to claim 8, further comprising
a wire guide member disposed on the bracket and extending transverse to the first axis, the wire guide member having an end disposed within the wire access opening of the pivot axle structure.

10. The bicycle control device according to claim 1, wherein
the bracket includes a first bracket part and a second bracket part, the second bracket part being a separate member that is attached to the first bracket part.

11. The bicycle control device according to claim 10, wherein
the first bracket part pivotally supports a first mounting end of the pivot axle structure, and
the second bracket part pivotally supports a second mounting end of the pivot axle structure.

12. The bicycle control device according to claim 11, wherein
the shift unit is at least partially disposed between the first bracket part and the second bracket part.

13. The bicycle control device according to claim 1, wherein
the bracket includes a hydraulic unit receiving cavity.

14. The bicycle control device according to claim 13, further comprising
a hydraulic unit disposed in the hydraulic unit receiving cavity and operatively coupled to the operating unit.

15. The bicycle control device according to claim 14, wherein
the hydraulic unit includes a piston that is moved in a direction away from the first axis as the operating unit moves from a rest position to an operated position.

16. The bicycle control device according to claim 15, wherein
the piston moves along a fourth axis, the fourth axis is disposed below the first axis as viewed in a direction parallel to the first axis in a state where the bicycle control device is mounted to the handlebar.

17. The bicycle control device according to claim 1, wherein
the bracket includes a gripping portion, a handlebar coupling surface disposed at a proximal end of the gripping portion and a shift unit housing portion disposed at a distal end of the gripping portion, the gripping portion including a first wire receiving pathway and the shift unit housing portion including a second wire receiving pathway communicating with the first wire receiving pathway.

18. The bicycle control device according to claim 17, wherein
the gripping portion has a pair of side surfaces and an upper surface that extends laterally between the side surfaces, the upper surface including the first wire receiving pathway, and
the shift unit housing portion has a laterally facing surface that includes the second wire receiving pathway.

19. A bicycle control device comprising:
a bracket configured to be coupled to a handlebar; and
an operating unit configured to be pivotally mounted to the bracket around a first axis, the operating unit including
a shift unit configured to operate a wire, the shift unit including a wire operating body having a wire connecting structure, the wire operating body being disposed such that the first axis passes through a portion of the wire operating body;
a first operating lever configured to operate the shift unit, the first operating lever being pivotally provided on the operating unit around a second axis; and
a pivot axle structure configured to pivotally mount the operating unit to the bracket around the first axis, the pivot axle structure defining a wire receiving passageway for the wire, the wire receiving passageway being substantially parallel to the first axis;
the shift unit being configured to rotate the wire operating body around a third axis in a first direction in response to movement of the first operating lever, and
the first axis being located below the second axis as viewed in a direction parallel to the first axis in a state where the bicycle control device is mounted to the handlebar, and the third axis being coaxial with the second axis.

\* \* \* \* \*